United States Patent

Duck, deceased

[15] 3,668,320

[45] June 6, 1972

[54] CONNECTION ARRANGEMENT FOR A TELEPHONE MICROPHONE AMPLIFIER WITH POWER SUPPLY CONNECTED TO THE OUTPUT SIDE OF THE AMPLIFIER

[72] Inventor: Wolfgang Duck, deceased, late of Munich, Germany by Hertha Duck, heir

[73] Assignee: Siemens Aktiengesellschaft, Berlin and Munich, Germany

[22] Filed: Sept. 11, 1969

[21] Appl. No.: 856,933

[30] Foreign Application Priority Data

Sept. 24, 1968 Germany......................P 17 62 924.2

[52] U.S. Cl. ..........................................................179/1 A

[51] Int. Cl. ..........................................................H03f 3/10

[58] Field of Search..........................179/1 A; 330/40, 69, 85

[56] References Cited

UNITED STATES PATENTS

| | | | |
|---|---|---|---|
| 3,316,423 | 4/1967 | Hull | 330/69 |
| 3,378,780 | 4/1968 | Lin | 330/85 |
| 3,399,276 | 8/1968 | Wolff | 179/1 A |

*Primary Examiner*—Kathleen H. Claffy
*Assistant Examiner*—Douglas W. Olms
*Attorney*—Birch, Swindler, McKie and Beckett

[57] ABSTRACT

A speech amplifier for telephone microphones including an input direct coupled, differential amplifier, and an output Darlington-connected amplifier, with the operating points stabilized by forward-biased diodes.

2 Claims, 1 Drawing Figure

PATENTED JUN 6 1972 3,668,320
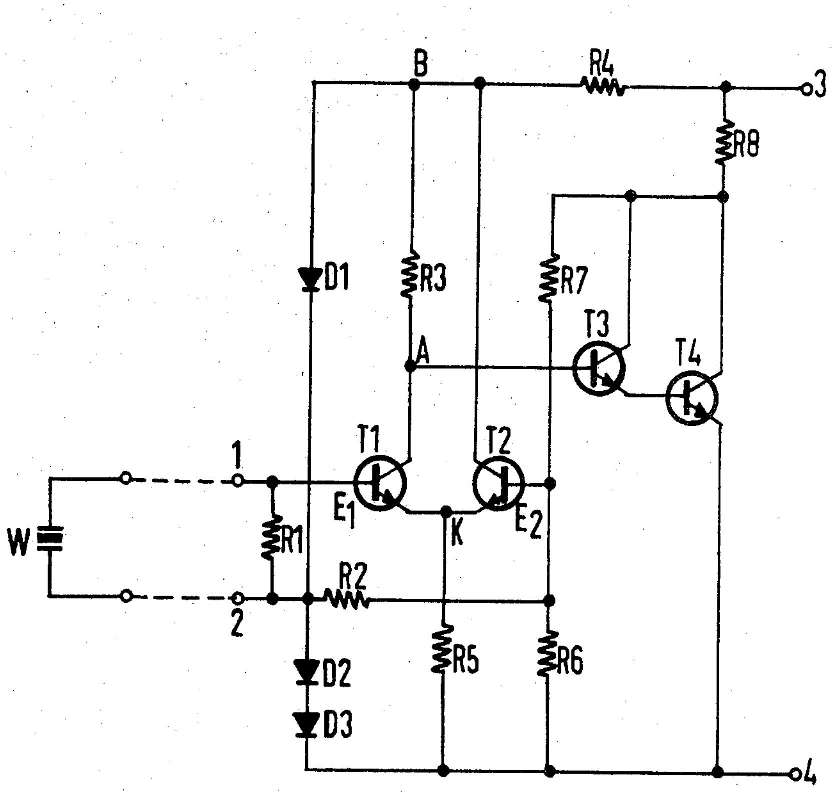

CONNECTION ARRANGEMENT FOR A TELEPHONE MICROPHONE AMPLIFIER WITH POWER SUPPLY CONNECTED TO THE OUTPUT SIDE OF THE AMPLIFIER

GENERAL DESCRIPTION

The present invention concerns a connection arrangement for a speech amplifier in subscriber stations of telephone installations. To improve the quality of the speech connection it is increasingly attempted to exchange the heretofore principally used carbon microphone for electro-acoustical transducers of higher quality, for example piezoceramics, as well as magnetic or dynamic transducers. In practice these high-quality electro-acoustical transducers, however, can only be used in long distance communication installations in conjunction with a speech amplifier. As the operating current in long distance communication installations is supplied over the *a–b* line, over which the amplified alternating current also flows, only speech amplifiers can be employed here which are supplied with power over the output side of the amplifier.

For microphone amplifiers of this type there have already become known a series of connection arrangements which exhibit, among other things, the common characteristic that they use, for direct current stabilization, capacitors in conjunction with other connection means. However if such microphone amplifiers are to be manufactured in the integrated circuit art, there results the problem that no capacitors of the required order of magnitude can be arranged in the integrated circuits. To solve this problem the invention provides a circuit arrangement for a microphone amplifier which no longer includes capacitors, so that the connection arrangement can be used for the manufacture of an integrated amplifier. The circuit arrangement according to the invention is characterized by the fact 1. that a differential feedback amplifier is provided as a first stage of the amplifier, after which follows an output stage in Darlington connection, operating as a controlled voltage source;

2. that there are provided diodes operated in the forward direction for stabilization of the operating point of the amplifier, as well as for the direct current supply of the differential amplifier, with the dynamic internal resistance whereof, which is dependent on the direct current supply, the effect of the changeable direct feeding current on the amplification is lessened by the positive feedback;

3. that the static voltages of the junctions of the arrangement are whole-number multiples of the threshold voltage of a P-N passage which is operated in the forward direction.

DETAILED DESCRIPTION

The advantages of the connection arrangement according to the invention will now be outlined with the aid of the working example shown in the attached drawing. The drawing shows an amplifier arrangement having an outlet 3, 4 over which the amplifier is also supplied with power and with an inlet 1, 2 to which any high-quality acoustical transducer W can be connected. The amplifier consists of a differential-amplifier, formed of transistors T1 and T2, as well as of an output amplifier stage with transistors T3 and T4 arranged in Darlington connection. The differential amplifier is a direct current differential voltage amplifier with very great amplification. Such direct current voltage amplifiers have an amplification of such magnitude that the amplification factor is determined solely by the negative feedback.

The modulated direct current or alternating voltage at the outlet of transducer W is provided to inlet E1 of the differential voltage amplifier and is amplified by transistors T1 and T2 and conveyed to transistors T3 and T4 which operate as a controlled voltage source.

As a positive voltage is provided at output terminal 3 of the amplifier, diodes D1, D2 and D3 are operated in the forward direction. Thereby the diodes can be considered as reference voltage sources, due to the slight dynamic inner resistance in this condition. Thus diode D1 forms a reference voltage source, while diodes D2 and D3 form a further reference voltage source. Both reference voltage sources serve to stabilize the amplifier operating points, as well as to supply current to the differential amplifier.

The direct current and alternating voltage resulting at collector outputs of transistors T3 and T4 is returned over feedback network R7, R6 and R2 to the input terminal E2 of the differential voltage amplifier. The feedback path of the direct current voltage thereby proceeds over resistor R7 and resistor R5, while the alternating voltage feedback path proceeds over resistors R7, R6 and R2, provided that the alternating current resistance of diodes D2, D3 is added on to resistor R2, which is then to be considered as being parallel to R6. The separation of direct current and alternating current feedback thus can be realized with the aid of the reference voltage source consisting of diodes D1, D2, operated in the forward direction.

In addition to the feedback path over resistors R7, R6 and R2, there also exists a positive feedback path over resistor R4 and diode D1. The dynamic internal resistance of diode D1 is dependent on the magnitude of the direct current supply so that with decreasing current supply the inner internal resistance increases. Accordingly, the effect of fluctuations of the current supply on the amount of amplification is lessened, by reason of the positive feedback of an opposite phase current, thereby causing negative feedback.

In order to stabilize the entire amplifier circuit against temperature and operating voltage changes, the amplifier arrangement was developed in such a way that the static voltages of all junctions of the circuit are whole-number multiples of the threshold voltage $U_{BE}$ of a PN-passage, operated in the forward direction. Thus, for example, the static voltage $2U_{BE}$ exists at point A by reason of the successive cascade connection of the base-emitter diodes of transistors T3 and T4. Point B however, is at the voltage $3U_{BE}$ due to the 3PN-passages of the three diodes D1, D2 and D3. For this reason there always exists across the operating resistor of transistor T1, resistor R3, the voltage drop $3U_{BE} = 2U_{BE} = 1U_{BE}$, which results in a constant collector current in transistor T1. Similarly, there exists the static quiescent voltage $2U_{BE}$ at point 2, and this same voltage is caused to exist at the inlets of the difference amplifier E1 and E2 over the PN-passages of diodes D2 and D3. For this reason there exists at point K the static voltage $1U$ since from that point through amplifiers E1 and E2, one PN-passage each is traversed.

Resistor R8 is provided in order that the direct current supply for diodes D1, D2 and D3 is not short-circuited over the through-connected transistor T4.

It will be evident that minor changes may be made in the illustrative embodiment of the invention described above. Accordingly, the invention is not to be considered limited to that embodiment, but rather only by the scope of the appended claims.

What is claimed is:

1. Amplifier means for telephone microphones having a power supply connected to the output side of the amplifier means, comprising:

a differential transistor amplifier having feedback constituting a first stage including means for receiving the output of a microphone, a Darlington connection transistor amplifier constituting an output stage for said differential amplifier, a plurality of semiconductor diodes connected in series across the output of said Darlington amplifier, said diodes being connected in the forward direction with respect to said power supply and means connecting said Darlington amplifier output, said diodes and said differential amplifier for supplying direct currents to said differential amplifier, for providing a signal feedback from said output stage to said first stage thereby degenerating any changes in output by reason of fluctuations in the power supply and for determining the operating points of the amplifier means, said connecting means being arranged with respect to said diodes and the transistors in said amplifiers in such a way that the terminals of the transistors in the quiescent state are maintained at whole number multiples of the threshold voltage of a PN junction operated in the forward direction in one of said transistors.

2. The apparatus of claim 1 in which said amplifier has input terminals for connection to a microphone, and output terminals for connection to a telephone line and said diodes are three in number connected in series between a first and second one of the output terminals of the differential amplifier, with the junction between a first and second one of the diodes connected to one input terminal, and resistively connected to the bases of the differential transistor amplifier, the base of one of the transistors being connected to the other input terminal and the base of the other transistor of the differential amplifier being resistively connected to said second output terminal, the emitters of said two transistors being connected together and their junction resistively connected to said second output terminal, and the collectors of said two transistors being resistively connected to said first output terminal, the input transistor of the Darlington amplifier having its base connected directly to the collector of said one transistor of the differential amplifier and its collector resistively connected to the base of said other transistor thereof, the output transistor of the Darlington amplifier having its emitter connected to said second output terminal and its collector connected with said first output terminal.

* * * * *